No. 708,549. Patented Sept. 9, 1902.
F. HEILIGER.
THERMOPHORE.
(Application filed July 2, 1902.)
(No Model.)

Witnesses

Inventor
F. Heiliger,
by H. B. Willson & Co.
Attorneys

UNITED STATES PATENT OFFICE.

FRITZ HEILIGER, OF ANDERNACH, GERMANY.

THERMOPHORE.

SPECIFICATION forming part of Letters Patent No. 708,549, dated September 9, 1902.

Application filed July 2, 1902. Serial No. 114,533. (No model.)

*To all whom it may concern:*

Be it known that I, FRITZ HEILIGER, director, a subject of the King of Prussia and Emperor of Germany, residing at Andernach-on-the-Rhine, 40 Breitestrasse, in the Kingdom of Prussia and Empire of Germany, have invented certain new and useful Improvements in Thermophores, of which the following is a full, clear, and exact description.

Means or appliances are already known for starting crystallization in thermophores. These means are mainly characterized by a screw, which by contact with the mass of a thermophore—say acetate of lead—effects the crystallization, and consequently emission of the latent heat of crystallization. The principal objection to the use of a screw is that it is necessary to loosen the same in order to operate the part which is attached to it for starting the crystallization, and as this screw must be tightened in order to prevent the thermophore substance from running out a special instrument—for instance, a key or a spanner—is necessary to turn the screw to impart to the point the motion required for bringing about the crystallization.

Now my invention has for its object and effect to obviate the necessity of loosening and retightening the closing-screw of the thermophore in order to start the crystallization—that is to say, the closing-screw remains in the tightened state in which it comes from the manufacturer—so that the volume or weight of the contents of the thermophore is in no way altered, the means or appliances in question being arranged within the thermophore in such a manner as to be in constant contact with the substance of same—*i. e.*, acetate of lead.

The means or appliances according to my invention consist of bodies which are moved in frictional contact with each other, and by means of the friction the crystallization of the mass within the sack, receptacle, or casing of the thermophore is started.

Figure 1:
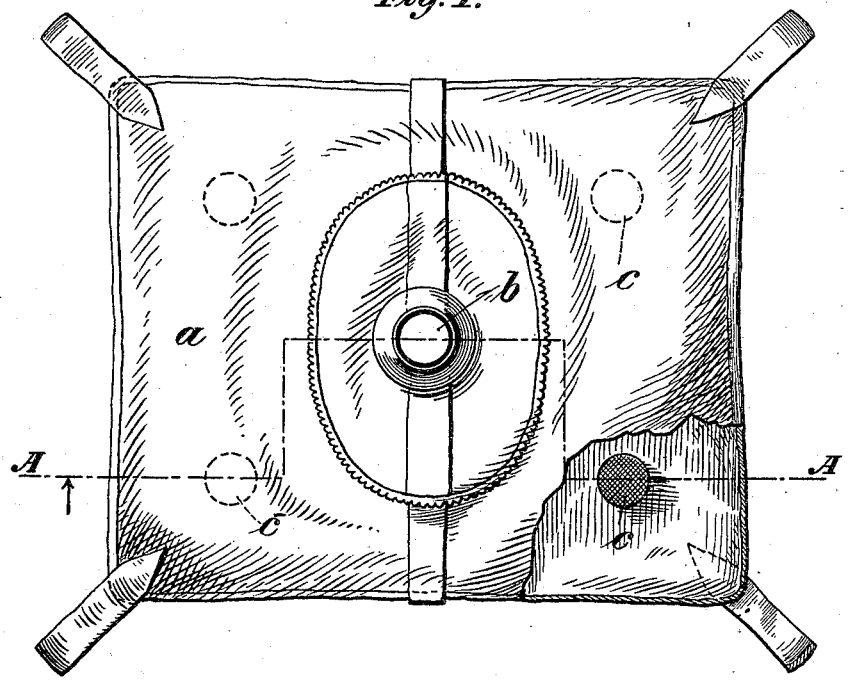
Figure 2:
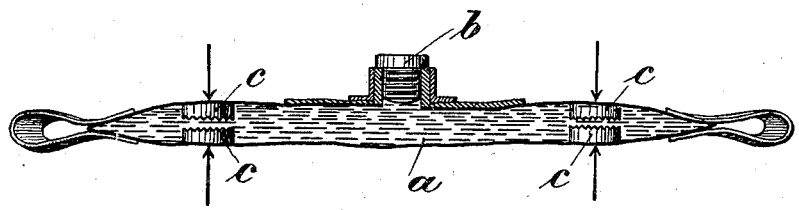

In the accompanying drawings I have illustrated the means for carrying out my invention, Figure 1 being a top plan view of the thermophore with a portion thereof broken away to show one of the frictional contact-bodies, and Fig. 2 being a longitudinal vertical sectional view on line A A.

*a* denotes a sack, receptacle, or casing made of any suitable flexible material and adapted to contain acetate of lead or any other substance or material possessing the same property—that is, the property of being crystallized.

*b* denotes a screw-plug or other closing device for closing the filling-aperture of the sack, receptacle, or casing, and *c* denotes the frictional contact-bodies arranged within said sack, receptacle, or casing in coacting pairs and at any desired points therein. The meeting faces of the bodies are preferably roughened, as shown in the drawings, to increase friction when their faces are rubbed against each other. The friction between the bodies is effected by compressing between the thumb and finger that part of the thermophore sack, receptacle, or casing which contains the bodies and then moving the thumb and finger in opposite directions.

As previously stated, I have shown one form of device for carrying out my invention; but as the invention resides, broadly, in a holder adapted to contain a crystallizable mass or material and provided with opposed frictional contact-surfaces designed for starting the crystallization of the mass I do not desire to be confined to the construction herein shown and described, but reserve to myself the right to make such changes as come within the scope of my claims.

I claim—

1. A holder adapted to contain a crystallizable substance, and opposed contact-surfaces arranged within the holder and movable toward and away from each other, whereby crystallization of the substance contained within the holder may be started by the friction obtained by the rubbing of the frictional surfaces together, substantially as described.

2. A flexible holder adapted to contain a crystallizable substance, and opposed contact-bodies arranged within the holder and movable toward and away from each other, whereby crystallization of the substance contained within the holder may be started by the friction obtained by the rubbing of the frictional bodies together, substantially as and for the purpose set forth.

In witness whereof I subscribe my signature in presence of two witnesses.

FRITZ HEILIGER.

Witnesses:
CHARLES L. SIMPLE,
HENRY QUARDFLIEG.